(12) United States Patent
Beamon et al.

(10) Patent No.: US 8,842,962 B2
(45) Date of Patent: Sep. 23, 2014

(54) FIBER OPTIC CABLE STRAIN RELIEF DEVICE AND METHOD

(71) Applicants: Hubert Blair Beamon, Haltom City, TX (US); Terry Dean Cox, Keller, TX (US)

(72) Inventors: Hubert Blair Beamon, Haltom City, TX (US); Terry Dean Cox, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/741,529

(22) Filed: Jan. 15, 2013

(65) Prior Publication Data

US 2013/0195414 A1 Aug. 1, 2013

Related U.S. Application Data

(60) Provisional application No. 61/591,629, filed on Jan. 27, 2012.

(51) Int. Cl.
*G02B 6/00* (2006.01)
*G02B 6/38* (2006.01)
*G02B 6/44* (2006.01)
*G02B 6/42* (2006.01)

(52) U.S. Cl.
CPC ............ *G02B 6/4401* (2013.01); *G02B 6/3817* (2013.01); *G02B 6/3897* (2013.01); *G02B 6/4442* (2013.01); *G02B 6/3894* (2013.01); *G02B 6/3887* (2013.01); *G02B 6/3879* (2013.01); *G02B 6/4248* (2013.01); *G02B 6/3849* (2013.01); *G02B 6/44* (2013.01)
USPC ................. 385/138; 385/53; 385/54; 385/56; 385/72; 385/136; 385/137

(58) Field of Classification Search
CPC .. G02B 6/3817; G02B 6/3887; G02B 6/3897; G02B 6/4442; G02B 6/4471; G02B 6/4248; G02B 6/3879; G02B 6/3849; G02B 6/44; G02B 6/4401; G02B 6/3894
USPC ........... 385/54–56, 58, 62, 69, 70, 76, 77, 81, 385/88, 136–138
See application file for complete search history.

(56) References Cited

U.S. PATENT DOCUMENTS 3,830,957 A * 8/1974 Oberdiear ...................... 174/78
4,568,145 A 2/1986 Colin et al.
(Continued)

FOREIGN PATENT DOCUMENTS

CH 689434 A5 4/1999
EP 1199587 A1 4/2002
(Continued)

OTHER PUBLICATIONS

Non-final Office Action for U.S. Appl. No. 13/302,067 mailed Jun. 7, 2013, 9 pages.
(Continued)

*Primary Examiner* — Mark Robinson
*Assistant Examiner* — Guy Anderson
(74) *Attorney, Agent, or Firm* — John H. Vynalek

(57) ABSTRACT

A strain relief device for a fiber optic cable is disclosed. The strain relief device has a cable fitting having a cable fitting body, a shoulder washer and a compression cap. The cable fitting is positioned on the fiber optic cable. The shoulder washer is installed on a central tube of the fiber optic cable, under strength members of the fiber optic cable and fitted in the cable fitting body. The compression cap is installed over the central tube with the strength members inserted through the compression cap. The strength members are compressed between the shoulder washer and the compression cap. The compression cap provides compressive force between the cable fitting body, the shoulder washer and the compression cap.

12 Claims, 10 Drawing Sheets

(56) References Cited

U.S. PATENT DOCUMENTS

| | | | |
|---|---|---|---|
| 5,012,042 A * | 4/1991 | Summach | 174/362 |
| 5,048,914 A | 9/1991 | Sneddon | |
| 5,064,268 A * | 11/1991 | Morency et al. | 385/87 |
| 5,067,783 A * | 11/1991 | Lampert | 385/60 |
| 5,082,454 A * | 1/1992 | Tonkiss et al. | 439/320 |
| 5,140,659 A | 8/1992 | Minds et al. | |
| 5,210,810 A * | 5/1993 | Darden et al. | 385/78 |
| 5,237,129 A * | 8/1993 | Obara | 174/667 |
| 5,461,688 A | 10/1995 | Lee | |
| 5,473,715 A | 12/1995 | Schofield et al. | |
| 5,542,015 A | 7/1996 | Hultermans | |
| 5,715,348 A | 2/1998 | Falkenberg et al. | |
| 5,722,842 A | 3/1998 | Cairns | |
| 5,754,724 A | 5/1998 | Peterson et al. | |
| 5,881,191 A | 3/1999 | Liberty | |
| 5,949,946 A | 9/1999 | Debortoli et al. | |
| 6,021,246 A | 2/2000 | Koshiyama et al. | 385/134 |
| 6,264,374 B1 | 7/2001 | Selfridge et al. | |
| 6,364,539 B1 | 4/2002 | Shahid | |
| 6,385,374 B2 | 5/2002 | Kropp | |
| 6,533,465 B1 | 3/2003 | Lesesky et al. | |
| 6,736,545 B2 | 5/2004 | Cairns et al. | |
| 6,931,193 B2 | 8/2005 | Barnes et al. | |
| 6,952,530 B2 | 10/2005 | Helvajian et al. | |
| 6,974,262 B1 | 12/2005 | Rickenbach | |
| 7,074,066 B2 | 7/2006 | Pepe | |
| 7,118,284 B2 | 10/2006 | Nakajima et al. | |
| 7,220,065 B2 | 5/2007 | Han et al. | |
| 7,300,216 B2 | 11/2007 | Morse et al. | |
| 7,304,241 B2 | 12/2007 | Trieb et al. | |
| 7,738,759 B2 | 6/2010 | Parikh et al. | 385/136 |
| 7,744,286 B2 | 6/2010 | Lu et al. | |
| 7,764,858 B2 | 7/2010 | Bayazit et al. | |
| 7,938,686 B2 | 5/2011 | Khemakhem et al. | |
| 7,942,587 B2 | 5/2011 | Barnes et al. | 385/53 |
| 8,107,785 B2 | 1/2012 | Berglund et al. | |
| 8,164,044 B2 | 4/2012 | Mossman | |
| 8,480,312 B2 | 7/2013 | Smith et al. | |
| 2003/0156798 A1 | 8/2003 | Cull | |
| 2005/0082467 A1 | 4/2005 | Mossman | |
| 2006/0133759 A1 | 6/2006 | Mullaney et al. | |
| 2006/0171639 A1 * | 8/2006 | Dye | 385/78 |
| 2007/0014522 A1 | 1/2007 | Yamaguchi et al. | |
| 2007/0263964 A1 | 11/2007 | Cody et al. | |
| 2008/0050070 A1 * | 2/2008 | Gurreri et al. | 385/55 |
| 2008/0175543 A1 * | 7/2008 | Durrant et al. | 385/72 |
| 2009/0148104 A1 | 6/2009 | Lu et al. | |
| 2009/0162016 A1 | 6/2009 | Lu et al. | |
| 2009/0245743 A1 | 10/2009 | Cote et al. | |
| 2010/0027955 A1 | 2/2010 | Parikh et al. | 385/135 |
| 2010/0040331 A1 * | 2/2010 | Khemakhem et al. | 385/75 |
| 2010/0079759 A1 | 4/2010 | Mossman | |
| 2010/0129039 A1 | 5/2010 | Smrha et al. | |
| 2010/0303431 A1 | 12/2010 | Cox et al. | |
| 2010/0329624 A1 | 12/2010 | Zhou et al. | |
| 2011/0123157 A1 * | 5/2011 | Belsan et al. | 385/75 |
| 2011/0188810 A1 | 8/2011 | Ciechomski et al. | |
| 2011/0200286 A1 | 8/2011 | Smith et al. | |
| 2011/0211326 A1 | 9/2011 | Drouard et al. | 361/814 |
| 2011/0229083 A1 | 9/2011 | Dainese et al. | |
| 2012/0039571 A1 | 2/2012 | Ciechomski et al. | |

FOREIGN PATENT DOCUMENTS

| | | | |
|---|---|---|---|
| JP | 07-72338 | 3/1995 | G02B 6/00 |
| WO | 2005078493 A1 | 8/2005 | |
| WO | 2006044080 A1 | 4/2006 | |
| WO | 2006060250 A2 | 6/2006 | |
| WO | 2006123214 A1 | 11/2006 | |

OTHER PUBLICATIONS

Final Office Action for U.S. Appl. No. 13/302,067 mailed Oct. 11, 2013, 11 pages.

Non-final Office Action for U.S. Appl. No. 13/014,229 mailed Sep. 23, 2013, 12 pages.

Applicant-Initiated Interview Summary for U.S. Appl. 13/014,229 mailed Jan. 31, 2014, 3 pages.

Advisory Action for U.S. Appl. No. 13/302,067 mailed Dec. 27, 2013, 3 pages.

Applicant-Initiated Interview Summary for U.S. Appl. No. 13/302,067 mailed Jan. 15, 2014, 3 pages.

Final Office Action for U.S. Appl. No. 13/302,067 mailed Jan. 27, 2014, 7 pages.

Advisory Action for U.S. Appl. No. 13/302,067 mailed Apr. 7, 2014, 3 pages.

International Search Report and Written Opinion for PCT/US2011/027813 mailed Jun. 24, 2011, 14 pages.

Non-final Office Action for U.S. Appl. No. 13/603,928 mailed Apr. 18, 2013, 11 pages.

Notice of Allowance for U.S. Appl. 13/603,928 mailed Sep. 23, 2013, 7 pages.

Notice of Allowance for U.S. Appl. No 13/603,928 mailed Jan. 15, 2014, 7 pages.

Final Office Action for U.S. Appl. No. 13/014,229 mailed May 22, 2014, 13 pages.

Notice of Allowance for U.S. Appl. No. 13/603,928 mailed Apr. 21, 2014, 7 pages.

Advisory Action for U.S. Appl. No. 13/014,229 mailed Jul. 10, 2014, 4 pages.

* cited by examiner

FIBER OPTIC CABLE STRAIN RELIEF DEVICE AND METHOD

RELATED APPLICATION

This application claims the benefit of priority under 35 U.S.C. §119 of U.S. Provisional Application Ser. No. 61/591,629 filed on Jan. 27, 2012, the content of which is relied upon and incorporated herein by reference in its entirety.

BACKGROUND

1. Field of the Disclosure

The technology of the disclosure relates to a strain relief device and method, including a device and method that provides strain relief for a fiber optic cable as it extends through the wall of an enclosure.

2. Technical Background

In the world of the ever-increasing need for broadband bandwidth optical cables have become the main part of telecommunication networks. Optical cables can transmit voice signals, data signals and video signals for very long distances with very high speed. Developments of optic telecommunication networks allow the connection of the end user directly to the optical fiber. This kind of network technology known as FTTH technology (fiber to the home) requires extending an "all optical" communication network closer to the subscribers. As a result such telecommunication networks include large number distribution points from a distribution cable to an end user or subscriber. To interconnect the large number of distribution points including to an end user or subscriber may require extensive and complicated cabling. Installation of many cables which provide the connection between a main distribution point and the end user requires effective strain relief to avoid damaging the cable upon and after installation.

SUMMARY

Embodiments disclosed in the detailed description include a strain relief device for a fiber optic cable. The strain relief device has a cable fitting having a cable fitting body, a shoulder washer and a compression cap. The cable fitting is configured to be positioned on the fiber optic cable. The shoulder washer is fitted in the cable fitting body. The compression cap provides compressive force between the cable fitting body, the shoulder washer. The shoulder washer is configured to be installed on a central tube of the fiber optic cable and under strength members of the fiber optic cable. The compression cap is configured to be installed over the central tube with the strength members inserted through the compression cap. The strength members are compressed between the shoulder washer and the compression cap.

Embodiments also include a method for strain relieving a fiber optic cable. The method includes positioning a cable fitting having a cable fitting body on the fiber optic cable; installing providing a shoulder washer on a central tube of the fiber optic cable and under strength members of the fiber optic cable; fitting the shoulder washer in the cable fitting body; installing a compression cap over the central tube; inserting the strength members through the compression cap; and tightening the compression cap on the cable fitting body, wherein the strength members are compressed between the shoulder washer and the compression cap, and wherein the compression cap provides compressive force between the cable fitting body, the shoulder washer and the compression cap.

DESCRIPTION OF THE DISCLOSURE

Embodiments disclosed in the detailed description include a strain relief device for a fiber optic cable. The strain relief device has a cable fitting having a cable fitting body, a shoulder washer and a compression cap. The cable fitting is positioned on the fiber optic cable. The shoulder washer is installed on a central tube of the fiber optic cable and under strength members of the fiber optic cable and fitted in the cable fitting body. The compression cap is installed over the central tube with the strength members inserted through the compression cap. The strength members are compressed between the shoulder washer and the compression cap. The compression cap provides compressive force between the cable fitting body, the shoulder washer and the compression cap.

Embodiments also include a method for strain relieving a fiber optic cable. The method includes positioning a cable fitting having a cable fitting body on the fiber optic cable; installing providing a shoulder washer on a central tube of the fiber optic cable and under strength members of the fiber optic cable; fitting the shoulder washer in the cable fitting body; installing a compression cap over the central tube; inserting the strength members through the compression cap; and tightening the compression cap on the cable fitting body, wherein the strength members are compressed between the shoulder washer and the compression cap, and wherein the compression cap provides compressive force between the cable fitting body, the shoulder washer and the compression cap.

Figure 1:
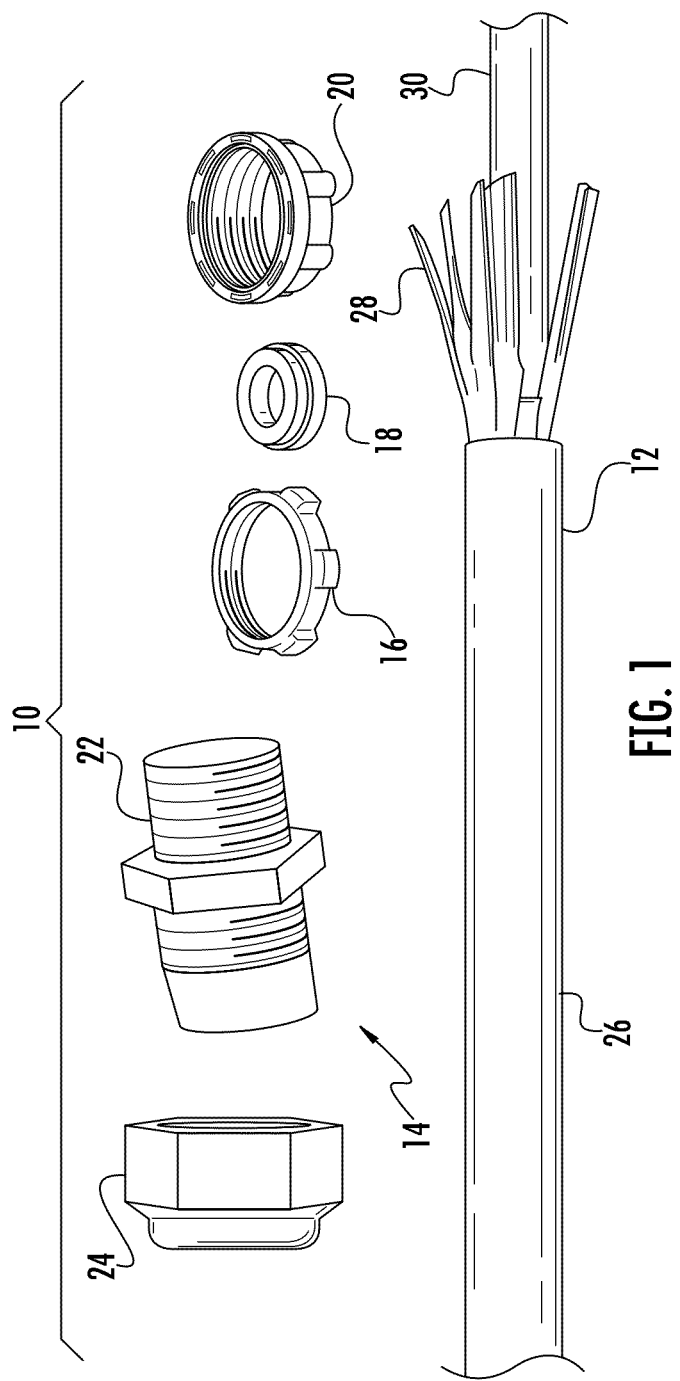
FIG. 1 is a view of separate individual components of an exemplary device that provides strain relief for an indoor fiber optic cable installation.

Referring now to FIG. 1 there is shown the fiber optic cable strain relief device 10 and a fiber optic cable 12. The device 10 includes cable fitting 14, cable fitting nut 16, shoulder washer 18, and compression cap 20. As shown in FIG. 1 the cable fitting 14 includes a fitting body 22 and a fitting cap 24. The fiber optic cable 12 includes a jacket 26, strength members 28 and central tube 30. As shown in FIG. 1, the jacket 26 has been stripped back to expose a certain length of strength members 28 and central tube 30.

Figure 2:
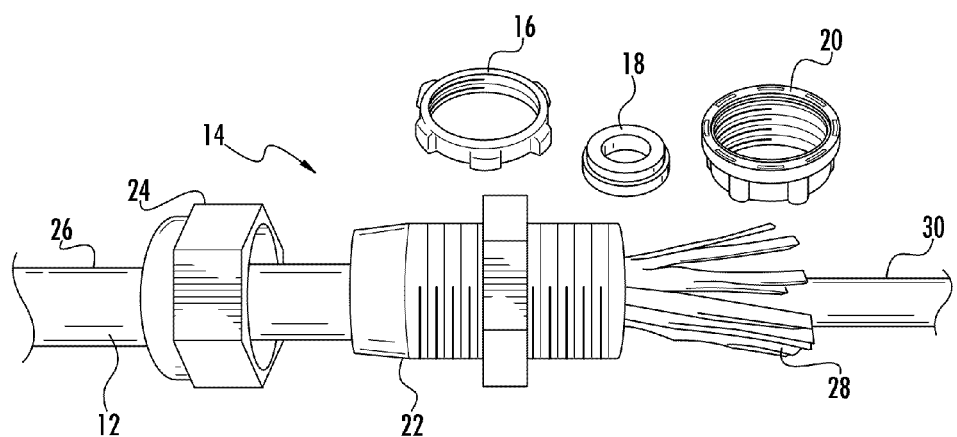
FIG. 2 illustrates a first in a sequence of views of the components of the device of FIG. 1 being progressively assembled on the fiber optic cable, showing a fitting cap and fitting body on a cable.
Figure 3:
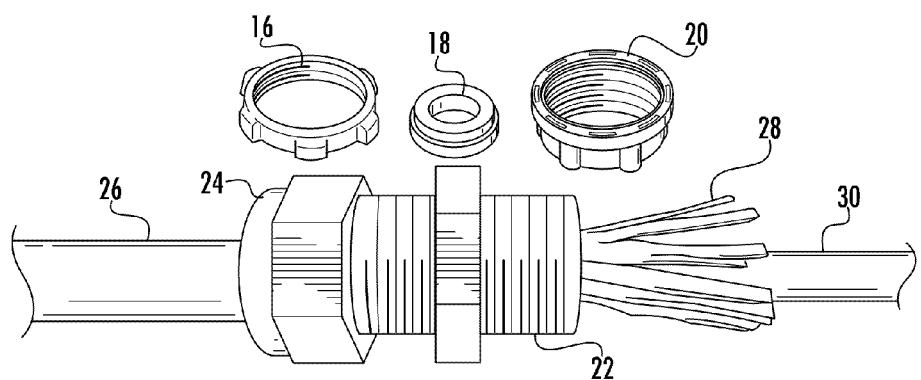
FIG. 3 illustrates a second in a sequence of views of the components of the device of FIG. 1 being progressively assembled on the fiber optic cable, showing the fitting cap attached to the fitting body.

Referring now to FIGS. 2-8, there is shown a sequence of the components 14, 16, 18, 20 of the fiber optic strain relief device 10 being progressively assembled on the fiber optic cable 12. In FIG. 2, the cable fitting 14 is installed on the fiber optic cable 12 with the fitting cap 24 and then the fitting body 22 positioned over the jacket 26. The strength members 28 and central tube 30 extend through the fitting body 22. FIG. 3 shows the fitting cap 24 tightened onto the fitting body 22.

Figure 4:
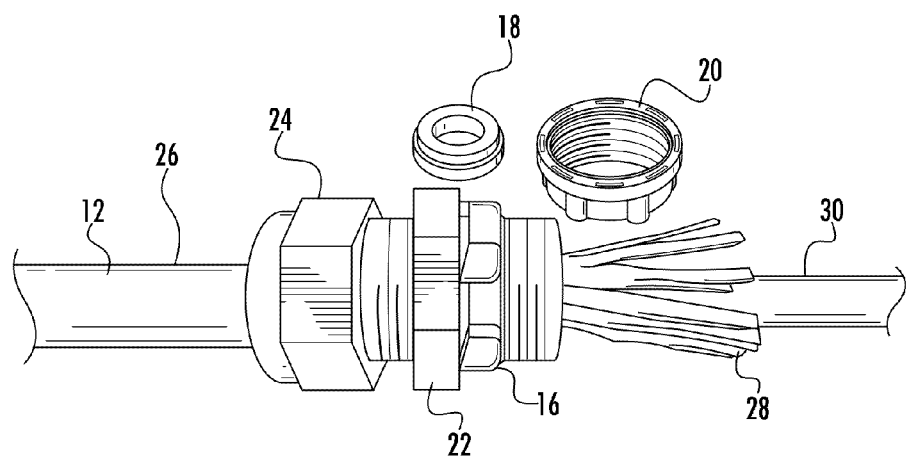
FIG. 4 illustrates a third in a sequence of views of the components of the device of FIG. 1 being progressively assembled on the fiber optic cable, showing a fitting nut attached to the fitting body.
Figure 7:
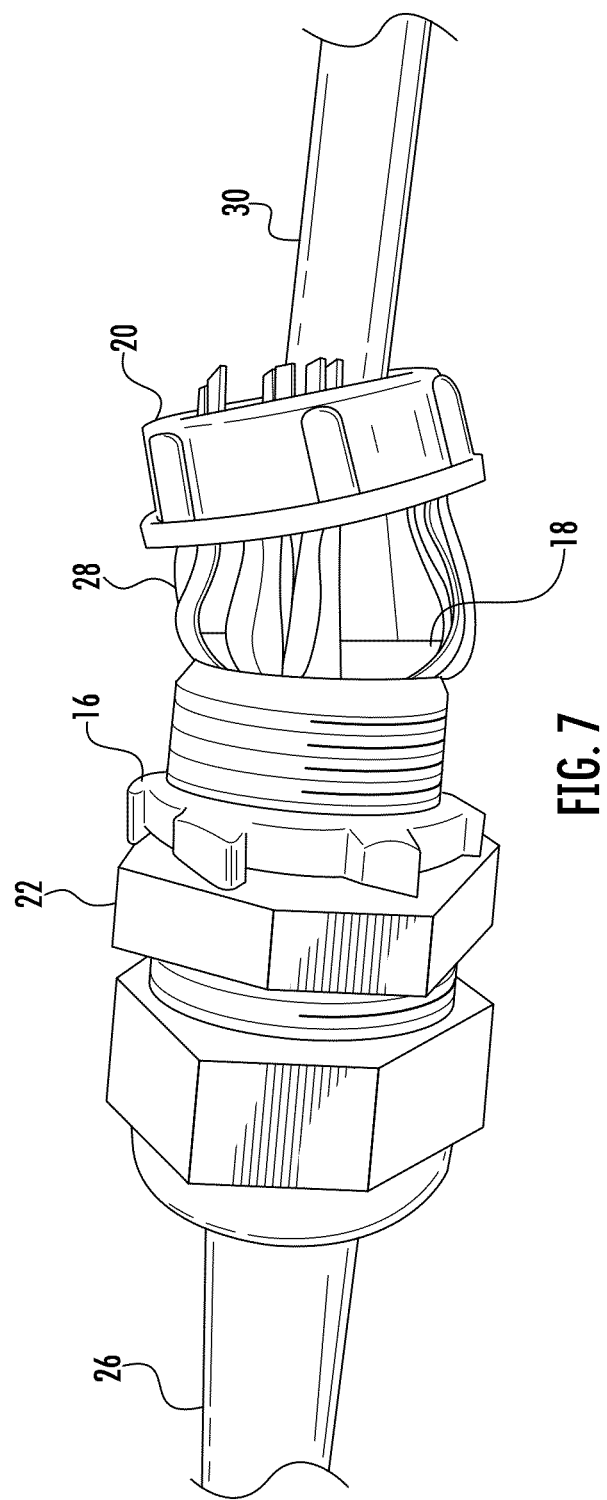
FIG. 7 illustrates a sixth in a sequence of views of the components of the device of FIG. 1 being progressively assembled on the fiber optic cable, showing a compression cap partially installed on the cable.
Figure 8:
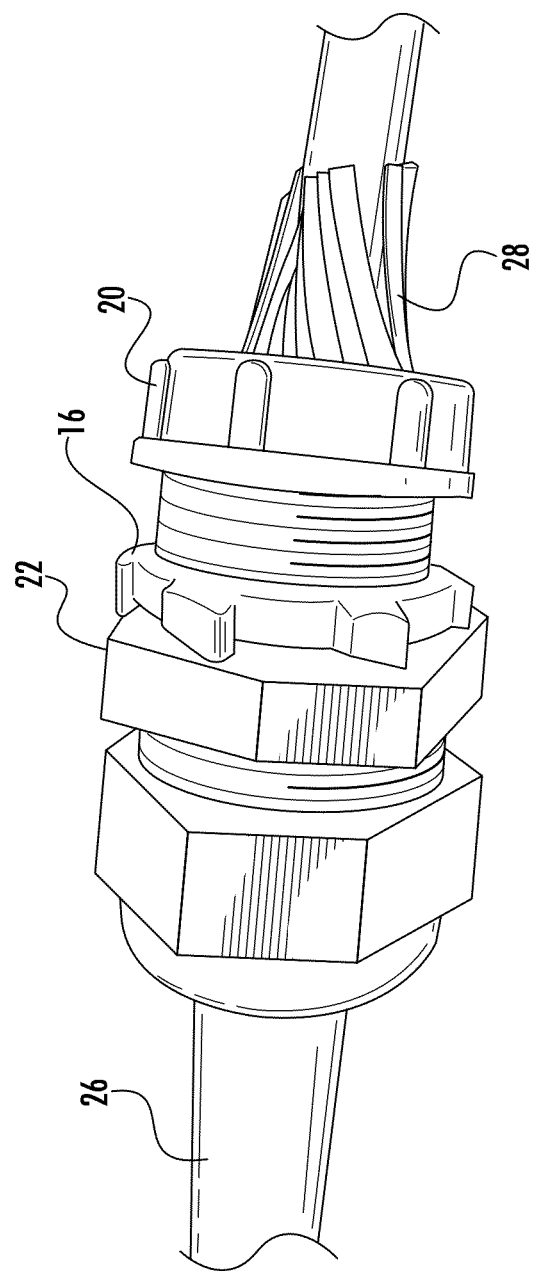
FIG. 8 illustrates a seventh in a sequence of views of the components of the device of FIG. 1 being progressively assembled on the fiber optic cable, showing the compression cap of FIG. 7 connected to the fitting body.
Figure 9:
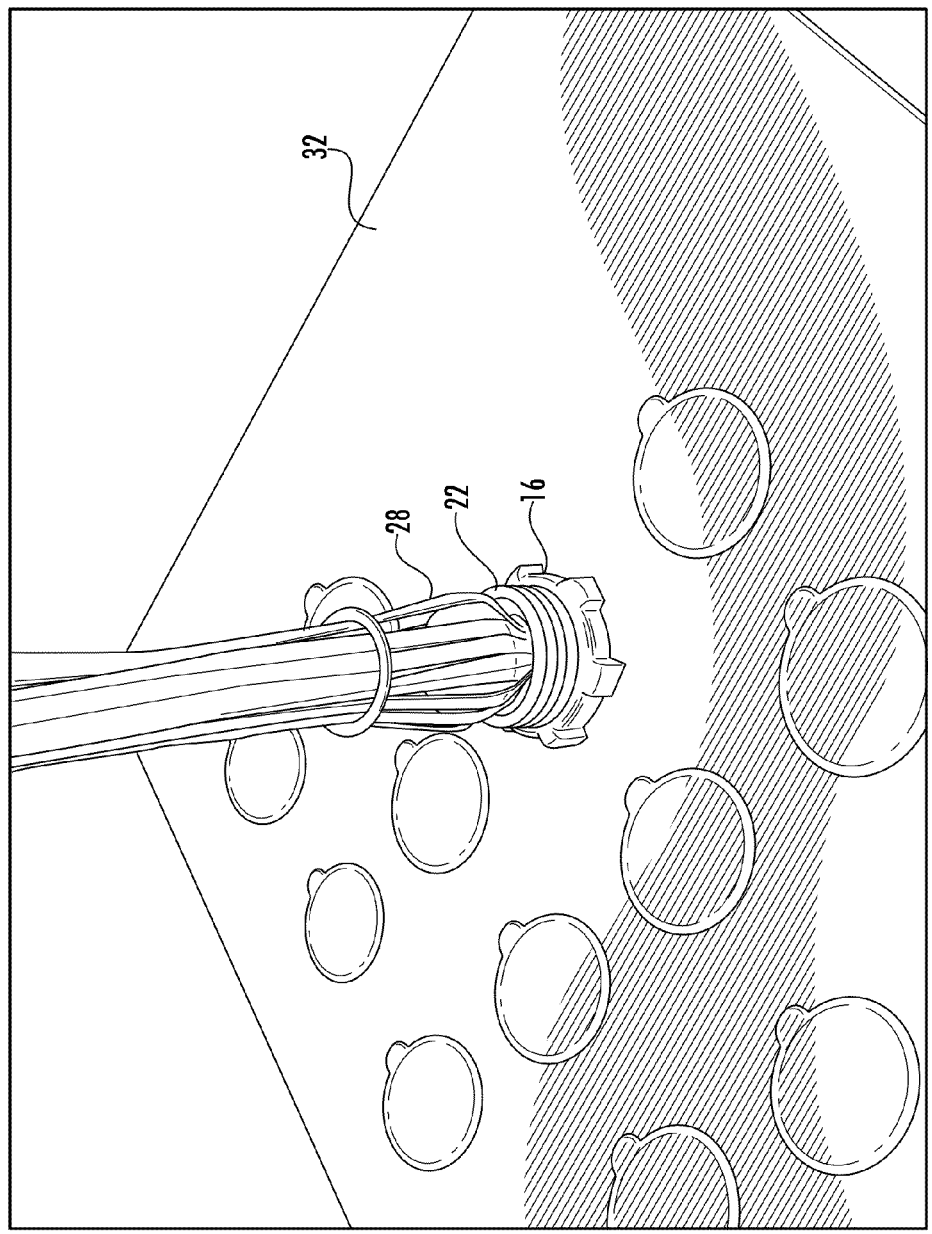
FIG. 9 is a view of the components of the device of FIG. 1 assembled on a fiber optic cable with the fiber optic cable extending through a wall or bulkhead without the compression cap FIG. 7 installed.
Figure 10:
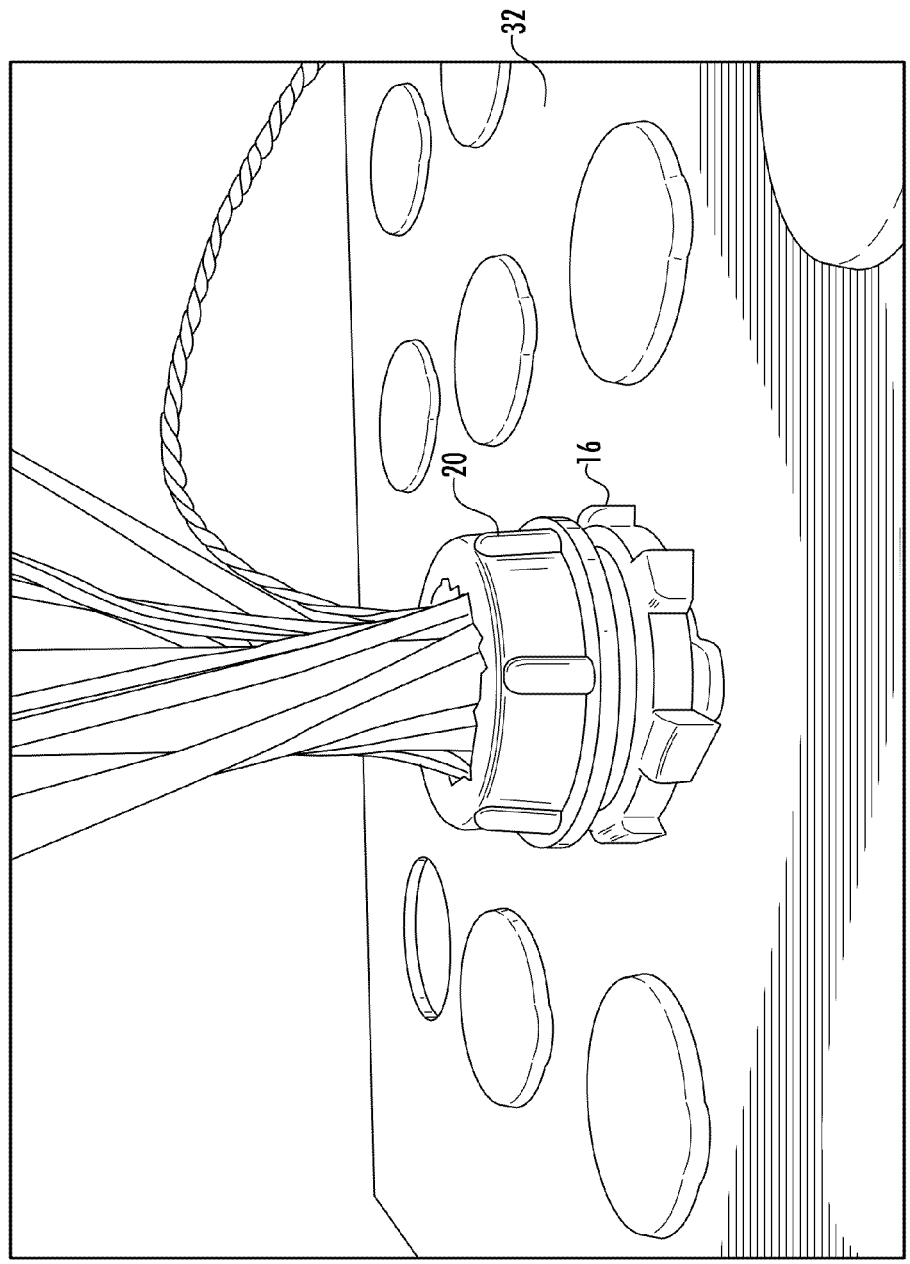
FIG. 10 is a view of the components of the device of FIG. 1 assembled on a fiber optic cable with the fiber optic cable extending through a wall or bulkhead with the compression cap of FIG. 7 installed.

FIGS. 4-8 illustrate the installation of the cable fitting nut 16, shoulder washer 18, and compression cap 20 on the fiber optic cable 12. Although not shown in FIGS. 4-8, it should be understood that the fitting body 22 is inserted through an opening in the wall of an enclosure or a bulkhead prior to the installation of the cable fitting nut 16, shoulder washer 18, and compression cap 20 on the fiber optic cable 12. FIGS. 9 and 10 illustrate such an installation. In FIG. 4, the cable fitting nut 16 is shown installed on the fitting body 22. The cable fitting nut 16 is used to releasably secure the fitting body 22 to the wall or bulkhead.

Figure 5:
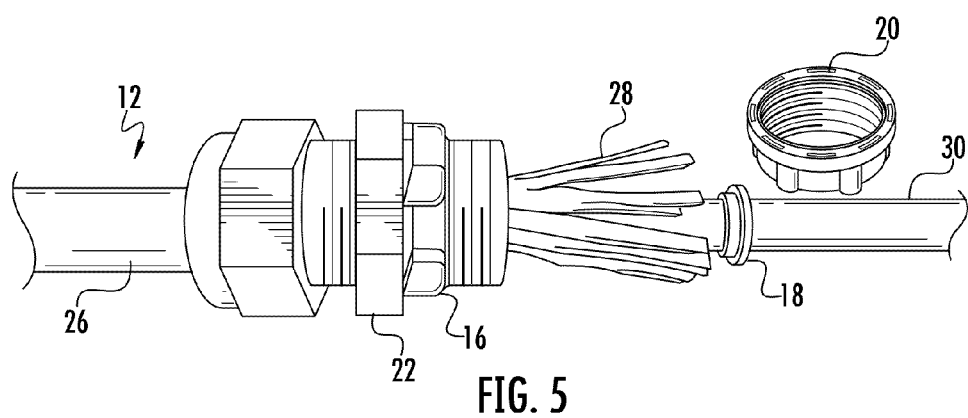
FIG. 5 illustrates a fourth in a sequence of views of the components of the device of FIG. 1 being progressively assembled on the fiber optic cable, showing a shoulder washer partially installed on the cable.
Figure 6:
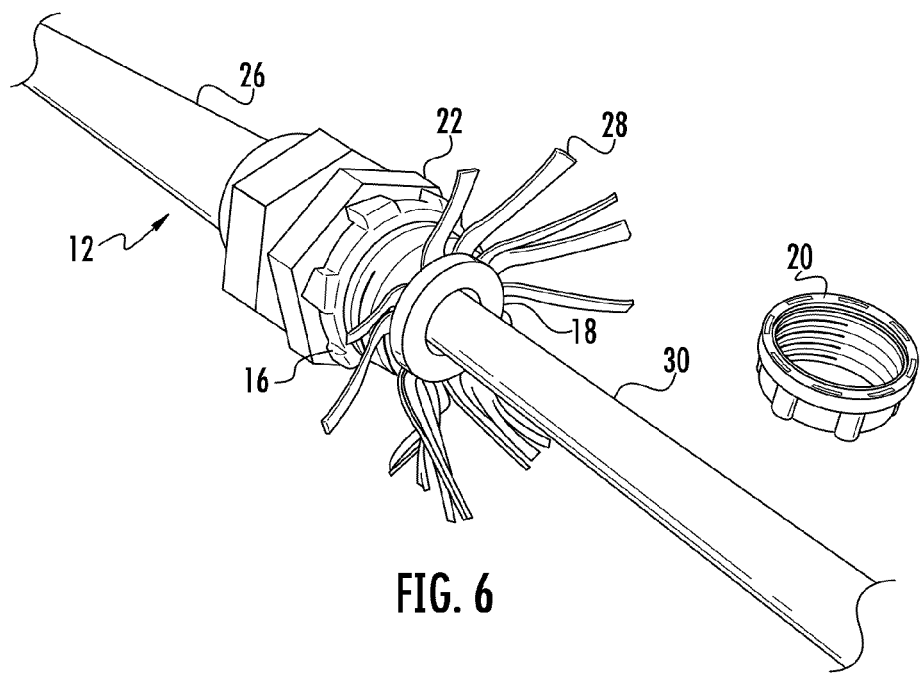
FIG. 6 illustrates a fifth in a sequence of views of the components of the device of FIG. 1 being progressively assembled on the fiber optic cable, showing a shoulder washer of FIG. 6 further installed on the cable and strength members extending around the shoulder washer.

FIGS. 5 and 6 illustrate the installation of the shoulder washer 18. The shoulder washer 18 is installed on the central tube 30 and under the strength members 28. The shoulder washer 18 is then fitted into the fitting body 22. In this way, the strength members 28 are captured and compressed between the cable fitting body 22 and the shoulder washer 18. FIGS. 7 and 8 illustrate the installation of the compression cap 20. The compression cap 20 is installed over the central tube 30 with the strength members 28 inserted through the compression cap 20. The compression cap 20 is then tightened on to the cable fitting body 22. In this manner, the strength members 28 are also compressed between the shoulder washer 18 and the compression cap 20. The compression cap 20 provides the compressive force between the cable fitting body 22, the shoulder washer 18 and the compression cap 20.

As shown in FIGS. 6-8, the strength members 28 are routed across a bottom flat of the shoulder washer 28, up the outside diameter of the shoulder washer 28 and back across the top flat of the shoulder washer 28. By routing the strength members 28 in this fashion, the retention of the strength members 28 are increased. In this regard, strain relief of between 25 and 50 lbs, or possibly greater pull out force may be provided.

Referring now to FIGS. 9 and 10, there is shown the strain relief device 10 and fiber optic cable 12 installed through a wall or a bulkhead 32. FIG. 9 illustrates the cable fitting 14 and shoulder washer 18, while FIG. 10 also shows the compression cap 20.

The cable fitting 14, cable fitting nut 16, shoulder washer 18, and compression cap 20 may constructed of any material including being injection molded plastic parts, which provides a low cost. The strain relief device 10 is easier to install and requires less room than conventional strain relief mechanisms.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A strain relief device for a fiber optic cable, comprising:
    a cable fitting comprising a cable fitting body;
    a shoulder washer positioned in the cable fitting body;
    a compression cap, wherein the compression cap is configured to be installed over the central tube of a fiber optic cable with strength members of the fiber optic cable inserted through the compression cap such that the strength members route across a bottom flat of the shoulder washer, up an outside diameter of the shoulder washer, and back across a top flat of the shoulder washer, and wherein the compression cap is configured to provide compressive force between the cable fitting body and the shoulder washer, and wherein the strength members are compressed between the shoulder washer and the compression cap when the compression cap is installed over the central tube of the fiber optic cable.

2. The strain relief device of claim 1, further comprising a fitting cap adapted to be installed on the cable, wherein the fitting cap attaches to the fitting body.

3. The strain relief device of claim 1, further comprising a fitting nut, wherein the fitting nut is adapted to releasably secure the fitting body through one of a wall and bulkhead.

4. A method for strain relieving a fiber optic cable, comprising:
    positioning a cable fitting having a cable fitting body on the fiber optic cable;
    installing a shoulder washer on a central tube of the fiber optic cable and under strength members of the fiber optic cable;
    fitting the shoulder washer in the cable fitting body;
    installing a compression cap over the central tube such that the strength members route across a bottom flat of the shoulder washer, up an outside diameter of the shoulder washer, and back across a top flat of the shoulder washer;
    inserting the strength members through the compression cap; and
    tightening the compression cap on the cable fitting body, wherein the strength members are compressed between the shoulder washer and the compression cap, and wherein the compression cap provides compressive force between the cable fitting body and the shoulder washer.

5. The method of claim 4, wherein the cable fitting includes a fitting cap and further comprising attaching the fitting cap to the fitting body.

6. The method of claim 4, further comprising providing a fitting nut, wherein the fitting nut is adapted to releasably secure the fitting body to at least one of a wall and bulkhead.

7. The method of claim 4, further comprising inserting the fitting body through one of a wall and bulkhead.

8. The method of claim 7, wherein the installing a shoulder washer, the fitting the shoulder, the installing a compression cap, the inserting the strength members, and the tightening the compression cap occur after the inserting the fitting body through one of a wall and bulkhead.

9. The strain relief device of claim 3, wherein the fitting nut is further configured to releasably secure the fitting body by compressing the one of a wall and bulkhead between the fitting nut and at least a portion of the fitting body.

10. A method for strain relieving a fiber optic cable, comprising:
    positioning a cable fitting having a cable fitting body on the fiber optic cable;
    inserting the cable fitting body through one of a wall and bulkhead;
    installing a shoulder washer on a central tube of the fiber optic cable and under strength members of the fiber optic cable;
    fitting the shoulder washer in the cable fitting body;
    installing a compression cap over the central tube;
    inserting the strength members through the compression cap; and
    tightening the compression cap on the cable fitting body, wherein the strength members are compressed between the shoulder washer and the compression cap, and wherein the compression cap provides compressive force between the cable fitting body and the shoulder washer;
    wherein the installing the shoulder washer, the fitting the shoulder, the installing the compression cap, the inserting the strength members, and the tightening the compression cap occur after the inserting the cable fitting body through one of a wall and bulkhead.

11. The method of claim 10, further comprising securing a fitting nut to the cable fitting body after inserting the cable fitting body through the one of the wall and bulkhead, such that the fitting nut is releasably secured to at least one of the wall and bulkhead.

12. The method of claim 11, wherein securing the fitting nut to the cable fitting body comprises compressing the at least one of the wall and bulkhead between the fitting nut and at least a portion of the cable fitting body.

* * * * *